Aug. 11, 1970          N. KARASICK          3,523,593
DUAL OVERRUNNING BRAKE SYSTEM ADAPTED FOR SEAT
BACK RECLINE ADJUSTMENT
Filed Nov. 19, 1968

INVENTOR:
Norman M. Karasick

BY: James R. Hoalson, Jr.
Philip T. Liggett
ATTORNEYS

3,523,593
DUAL OVERRUNNING BRAKE SYSTEM ADAPTED FOR SEAT BACK RECLINE ADJUSTMENT

Norman M. Karasick, Falls Village, Conn., assignor to Universal Oil Products Company, Des Plaines, Ill., a corporation of Delaware
Filed Nov. 19, 1968, Ser. No. 776,933
Int. Cl. F16d *51/08;* A47c *3/00*
U.S. Cl. 188—82.3                                    6 Claims

ABSTRACT OF THE DISCLOSURE

An inner overrunning roller clutch unit is positioned around a stationary hub section and on the inside of a cylindrical-form race member to brake the race member in one direction of rotation, while an outer overrunning roller clutch unit is positioned around the race member. Each of the clutch units have a ramped or cam surfaced ring portion to provide locking and unlocking of each of the clutch units when moved in the same rotational directions; however, mechanically movable roller release means connects with the inner cammed surface ring to permit movement of the assembly in a direction opposite to the locking direction. The dual clutch system functions as a brake for seat back recline adjustment and, in a preferred arrangement there is also frictional braking of movement in both directions to preclude a loose feel or too rapid a movement for a seat back or other member being attached to the locking system.

---

This invention relates to a device for locking or braking against rotational movement in one direction. More particularly the invention is directed to a dual overrunning roller clutch system which provides for automatically locking or braking against rotational movement in one direction, but permits mechanical release and adjustment such that the device is well adapted for effecting seat back recline adjustment.

There are, of course, various types of seat back recline adjustment devices which are in use with passenger vehicle seats. For example, a large proportion of the airplane seat constructions make use of hydraulic lock devices. The hydraulic lock is of advantage in that a movable piston and connecting rod means can be easily moved in either direction by the use of valving in fluid passageways that, in turn, permits the fluid to flow from one side of a piston to the other within a cylinder unit. On the other hand, fluid leakage problems in connection with the hydraulic locks provides for high maintenance costs and possible oil damage to adjacent equipment, passenger luggage, packages, and the like. Many of the present types of mechanical seat adjustment means are also troublesome in that they may require frequent servicing to keep in good operation or repair. At the same time many of the designs are quite costly and thus require a high initial first cost.

For airplane or land vehicle passenger seating, it is generally required that seat back movement be well controlled in each direction so that a seat back will not "flop" or move too rapidly in either direction. For instance, a back recline adjustment should be slow in the rearward direction so as not to suddenly fall against the knees of a passenger to the rear. In addition, it is desirable that the seat back erecting operation be carried out fairly rapidly and easily. Actually, a preferred system permits a stewardess or other attendant to "dress" or raise all seat backs to an upright position without resorting to the use of a "release" button; however, such raising operation should have some resistance or "drag" so as to preclude a "too rapid" or loose feeling. Still further there should be an energy absorption means for resisting or absorbing energy in a crash or seat back "breakover" situation.

It may be considered a principal object of the present invention to provide a dual overrunning roller clutch system which, in turn, provides for automatically locking against movement in one rotational direction. The overrunning brake or one-way clutch means used in the present system is one of the general type such as disclosed in U.S. Pats. Nos. 2,843,238; 3,184,020; and 3,087,588.

It is also an object of the invention to provide a locking dual overrunning roller clutch system which is adapted for use in effecting seat back recline adjustment, with means to permit lock release by movement of a ramped ring or roller cage for wedging one set of rollers in the system.

A still further object of the invention is to provide an overrunning roller type clutch system which combines therewith one or more braking arrangements which will effect a controlled movement for a seat back or other structure which is connected to the clutch system for adjustable locked positioning.

Broadly, the present invention provides a mechanically adjustable lock assembly that embodies dual overrunning roller clutch means and is adapted for positioning pivoted structures, with such assembly comprising in combination, a hub member adapted to be attached to a structure at a pivot point, an internal cammed ring positioned around said hub member and having a plurality of spaced cammed surfaces and a plurality of rollers movably retained therearound, with one roller for each cammed surface, a movable ring-form race positioned around the rollers and providing an overrunning roller clutch action and engagement of said race with said hub for one direction of rotation, a second and outer cammed ring with a plurality of spaced cammed surfaces and a plurality of rollers retained within the latter to thereby provide a second and outer overrunning roller clutch action and engagement of said outer ring with said race, said second cammed ring having its cam surfaces ramped oppositely to said inner cammed ring, whereby the race is clutched by said second plurality of rollers for the same direction of rotation as provided by the inner plurality of rollers, and means connecting said second and outer ring with a structure to be adjusted to effect the locking thereof in one direction of rotational movement and its mobility in the other direction.

The present system may be utilized for effecting the adjustable locking against rotational movement in one direction and as a result is particularly useful in connection with effecting the adjustment of a seat back where it is desired to have a reclining type of seat or lounge construction.

It is recognized that one-way clutch means, or overrunning roller clutch assemblies, are commonly used to provide for a one-way rotational operation, however, the present improved system makes use of a dual overrunning clutch system with one roller clutch being concentrically within the other, whereby there may be adjustment of position by providing for the momentary release of at least one of the roller clutch assemblies with respect to an annular race. Where the assembly is used for seat back adjustment, the entire assembly will be mounted such that the center thereof, or its hub section, will be mounted on a seat support at the zone of a seat back pivot point. Thus, the outer movable ring of the assembly, when connected with a seat back frame, can in turn provide for the adjustable positioning and locking of the seat back. In the operation of a simple roller clutch assembly, there is a rapid easy movement in the "unlock" direction. This easy movement in the one direction can, in some instances, be dangerous or undesirable so that in a preferred form of overriding clutch assembly which is used in combination with a seat back for adjustment purposes, there is incorporated suitable braking means to slow down the movement in the "free" direction.

A more specific embodiment of the present invention provides that frictional braking means be provided around, and/or within the movable race portion of the dual overrunning clutch assembly, whereby free movement of the race member will be slowed in at least one direction of rotation. However, it should be pointed out that in utilizing the present assembly for seat back adjustment, it may be of advantage to slow down seat back movement in a rearward direction or "lock" direction at such times as there is a release of the locking rollers so as to, in turn, prevent a falling sensation or an unexpected contact with a passenger to the rear of the seat. At the same time it is of advantage to provide for an adjustable drag or braking action on the upward movement of the seat back such that it does not move too rapidly or impart a loose feel in its operation. Thus, in a preferred construction and arrangement of the dual clutch assembly, there will be braking means which will operate against the annular race so as to preclude rapid, loose movement in either direction of rotation.

Various methods of effecting braking of one or more annular rings in the system may, of course, be used. For example, in one instance there may be a circumscribing brake band arrangement which is automatically or adjustably tightened with levers or spring biasing means so as to effect a drag or braking action on the movement of the seat back adjustment ring or race member. In another instance, there may be an internally positioned and expanding brake band arrangement which operates responsive to a biasing spring or to a cam or wedge means which will provide for braking in one direction only.

Inasmuch as the present dual system utilizes inner and outer roller clutch systems, each of which is arranged to act upon a race or ring member positioned therebetween, it is necessary that at least one of the one-way clutch arrangements have means to be freed from the wedge action on the race and permit a release from the normal locking direction. In one embodiment, there may be one or more radially positioned pin means through the hub section of the assembly and means connecting to or contacting the pin means to effect at least a slight movement of the inner cammed ring to, in turn, effect a dislodgement of the wedging action of the inner plurality of rollers. This action will permit the encompassing annular ring and outer roller clutch assembly to move with respect to the hub section in a direction which would normally effect a locking of each of the one-way roller clutch units. In still other modifications or embodiments, there may be means to momentarily effect the unlocking or displacement of the rollers in the outer cammed ring, while leaving the inner rollers wedged or locked so that as a result the outer cammed ring of the outer clutch unit may be rotated about the hub section in a direction which would normally lock the assembly.

Reference to the accompanying drawing and the following description thereof will serve to illustrate the construction and arrangement of the improved dual clutch assembly as well as shown how such assembly may well be utilized for the adjustable positioning of a reclining seat back in connection with seating structures.

Figure 1:
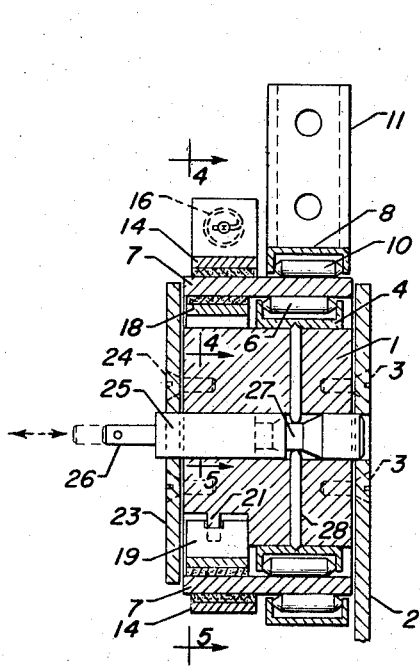
FIG. 1 of the drawing is a sectional view through the dual overrunning roller clutch assembly.
Figure 2:
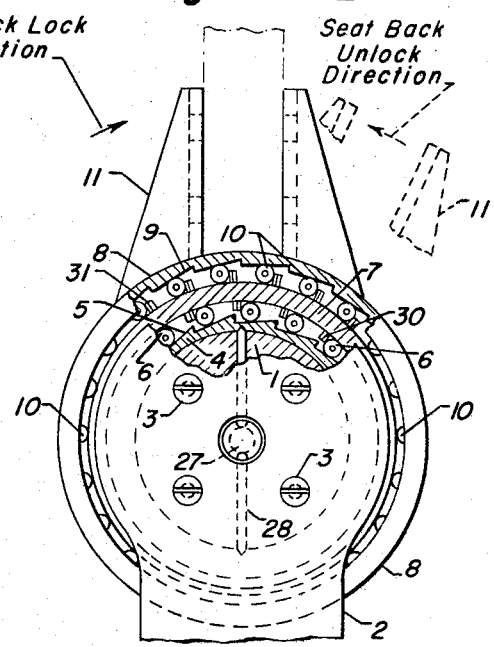
FIG. 2 is a side elevational view of the dual assembly, shown partially in section, and at the same time illustrates how the assembly may be attached to a structure requiring adjustable positioning and locking against one direction of movement.

Referring now particularly to FIGS. 1 and 2 of the drawing, there is indicated an assembly which uses two sets of overrunning roller clutch units around a central hub section 1. The latter is, in turn, indicated as having a side mounting plate 2, held by cap screw means 3, whereby the entire assembly may be mounted to a suitable supporting structure in any desired manner.

Mounted circumferentially around hub section 1 is an internal cammed ring member 4 which has a plurality of spaced cammed surfaces 5. The latter serve to wedge and hold each of the plurality of roller members 6 that are also spaced circumferentially around the cammed ring. Positioned over the rollers 6, and the entire hub section 1, is a circular ring or race member 7 having both the inner and outer surfaces smooth and true. Thus, where there is a roller 6 for each of the wedged or cammed surfaces 5, there will be a clutching action between the inner cammed ring 4 and the inner surface of race 7. In the present embodiment, as shown in FIG. 2, a clockwise movement of the race 7 or, conversely, a counterclockwise movement of the inner hub 1 and ring 4 will effect a movement with respect to rollers 6 which will cause each of them to wedge between the sloping wedge surfaces 5 and the interior circumference of race 7 to effect a locking action. On the other hand, as long as the race 7 is moved in a counterclockwise direction (as shown in FIG. 2) then rollers 6 will not be lodged or positioned within a locking position on the sloping surfaces 5 of cammed ring 4 and there will be free movement of the race 7 with respect to the hub 1.

In accordance with the present improved assembly, there is provided a second or outer cammed ring 8 which has a plurality of sloping sections or cammed surfaces 9 that are spaced around the interior circumference thereof, as well as spaced from the outer surface of race 7 so as to provide for a plurality of circumferentially spaced rollers 10. This arrangement provides an outer one-way roller clutch unit utilizing the outer surface of the internally positioned race member 7. Also, as shown in FIG. 2, a clockwise direction of rotation for the outer cammed ring 8 will provide for the wedging of rollers 10 against cam surfaces 9 and the clutch locking of ring 8 with respect to ring 7 and with respect to the hub member 1. Conversely, a counterclockwise movement of outer cammed ring 8 (as shown in FIG. 2) will provide for the free rotational movement of such ring 8 and any device of structural member connected therewith.

In the present diagrammatic drawing, there is shown a pair of projecting bracket members 11 which may be bolted or otherwise connected to a seat back frame or other member to be rotated. There is also shown, in FIG. 2 of the drawing, an arrow pointing in a clockwise direction with the indication that a seat back frame connected to the outer cammed ring member 8 will be locked as it is pushed against or moved in a clockwise direction. There is also shown a dashed line arrow with a diagrammatic indication that seat back framing, or other movable member connecting to the brackets 11 and the outer cammed ring 8, will be permitted to move freely in a counterclockwise unlocking direction.

Figure 3:
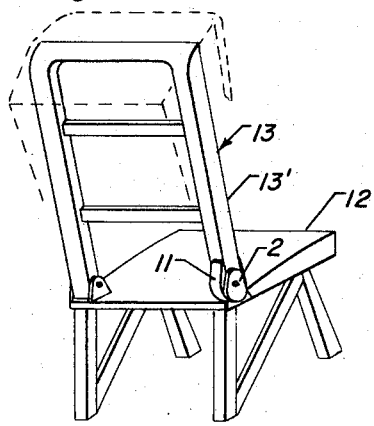
FIG. 3, indicates in a diagrammatic manner, the utilization of the present dual clutch assembly at a pivot point with respect to a seat back.

With reference to FIG. 3 of the drawing, there is indicated a seat frame 12 and seat back framing 13, with the latter having one portion of the frame, such as post 13' thereof connecting to bracket means 11, corresponding to those shown in the dual clutch assembly of FIG. 2. Also, there is indicated a side plate 2 which is shown connecting to the seat framing 12 at a pivot point for seat back 13 whereby there may be the mechanically adjustable dual clutch locking for the recline positioning of the seat back.

Figure 4:
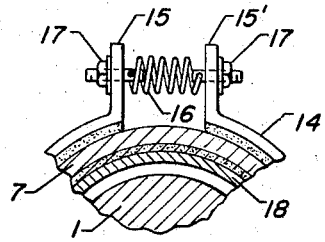
FIGS. 4 and 5 indicate, respectively, in partial sectional views along lines "4—4" and "5—5" in FIG. 1, the use of spring biasing means and wedging means for effecting a brake action against the movable annular race of the assembly.

Referring again to FIG. 1 of the drawing, as well as to FIG. 4, there is indicated diagrammatically the positioning of an external brake band 14 which has suitable liner means along the inside surface and is adapted to compress against the external surface of the race member 7. As best shown in FIG. 4, the brake band 14 is shown to have a split construction with end flange portions 15 and 15' in turn adapted to be pulled toward one another by suitable spring biasing means 16. The spring 16 is indicated as being held to the flanges 15 and 15' by threaded end portions and nuts 17. It will thus be seen that by the use of a suitable tension action from spring 16 on the brake band 14 that the latter will be in constant compression around the race member 7 and cause a drag against its rotational movement. As mentioned briefly hereinbefore, there are certain types of operations, such as seat back adjustment, where it is of advantage to effect a braking of the movement of the dual clutch assembly so as to preclude a too rapid or "loose" type of action. In this instance, the braking arrangement as provided by band 14 or race 7 will provide for slowing down the movement of the latter for either the clockwise or counterclockwise directions and, in the case of seat back operation, there would be a slowing of the recline action, as well as the lifting or "dressing" of the seat back to an upright position.

It is, of course, not intended to limit the present improved dual clutch assembly to the use of any one type of braking system inasmuch as other types of frictional braking actions may be embodied or, alternatively, other types of power action may be used to operate the brake band in lieu of the spring biasing means.

Figure 5:
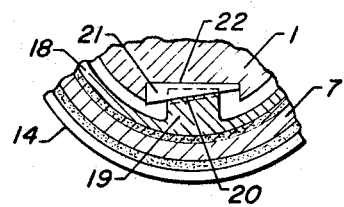

Still further, as best shown in FIGS. 1 and 5 of the drawing, there is indicated the use of an internally expanding brake band member 18 which is positioned directly adjacent to the internal surface of race 7 and around the internal hub section 1 in a manner to be free to expand against the inner surface of the race 3 and cause a braking or "drag" on the latter. In this instance, as best shown by FIG. 5, there is shown a split brake band construction and an internally projecting bearing member 19 with a sloping surface portion 20. The latter is adapted to engage with or bear against an internal wedge member 21 which may be built as part of the hub member 1 and extend outwardly from a notched portion 22 in the latter. Thus, as best shown in FIG. 5, where the hub member 1 has a counterclockwise direction with respect to race 7 and to the internal brake band 18, there will be a pressure against the projection 19 and an expansion of brake member 18 against the inner surface of the race 7 to cause a braking action on the latter and a slowing down of the movement thereof.

This brake embodiment, of course, provides a one-way braking operation and can be utilized to assist in preventing the seat back, or other structural member to which the assembly is attached, from reclining in a rapid or precipitous manner or, conversely, by reversing the slope of the wedge surfaces 20 and 21 for the respective members there can be a braking action on the raising of the structure.

Again it should be pointed out that modifications may be made with respect to the construction and assembly of an internal expanding form of braking means in combination with the movable race 7 and thus with respect to the outer cammed ring 8. For example, the inner brake band 18, as shown in the present drawing, may have a compression spring biasing means to effect a continuous outward pushing action on the brake band member 18 and a corresponding continuous braking action on the adjacent race member 7. As best shown in FIG. 1 of the drawing, both the brake band members 14 and 18 have been positioned to be, in effect, alongside of the respective cammed ring members 8 and 4 so as to be able to provide a braking action on the encompassed race member 7. For purposes of assembly, a retainer plate 23 is positioned to extend over the side of the hub section 1 and the inner brake band member 18 so as to enclose the latter. The plate member 23 is held to the hub member 1 by spaced bolt means 24, or by other equivalent clamping and holding means.

Figure 6:
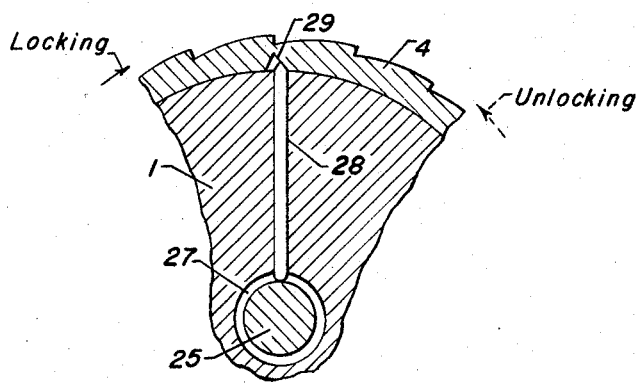
FIG. 6 indicates, in a partial sectional elevational view, an arrangement of radial pin means to effect a slight movement for an inner cammed ring from the action of a transverse axially positioned rod member.

In order that there may be a release and/or adjustability of the present dual clutch assembly and permit the adjustable positioning of seat back, or other structure, in either direction with respect to the central hub portion 1, there is necessarily means provided to effect an "unlock" or dislodgement of the locking rollers for at least one of the two sets of one-way clutch units. In the present simplified embodiment illustrated, there is indicated the use of mechanically movable means for effecting a nudging, or slight movement, of the inner cammed ring member 4 so that the plurality of rollers 6 are in turn permitted to be unlocked with respect to the wedged contact between cam surface 5 and the inside periphery of race 7 and thereby permit a clockwise movement of the race 7 and the outer cammed ring 8, as shown in FIG. 2. With reference to FIG. 1 of the drawing, there is shown a transverse or axially movable rod member 25 having an outer pull member 26 such that there may be a transverse movement of the rod member 25 with respect to the hub section 1. The axially positioned member 25 is, in turn, provided with an internal tapered wall or groove portion 27 at a point that is in alignment with one or more radially extending pin members 28. The latter is sized and positioned to extend from a point of contact with the sloping surface of groove 27 to an outer point that is in contact with the internal cammed ring 4. As best shown in FIG. 6 of the drawing, the outer ends of pins 28 have a tapered configuration to fit into a small V groove section 29 within the body of the ring 4. Thus, when rod member 25 is pulled transversely so as to cause the sloping surface of groove 27 to push the pins 28 radially outwardly such that their end portions thereof will bear against and push on the side of groove means 29 to in turn slightly move the entire ring member 4 with respect to hub section 1. This slight movement, as heretofore noted, dislodges the wedge action of rollers 6 between cam surfaces 5 and the internal periphery of race 7 so that the latter may move in what would normally be the "lock" direction. In other words, with respect to seat back adjustment, where the entire assembly has provided for a particular positioning and locking of the seat back by means of the wedging of rollers 6 in the inner clutch unit, as well as a wedging of rollers 10 in the outer clutch unit, then there is a momentary release of race 7 from rollers 6 and such race member together with the outer clutch unit can move in a further recline position before again locking. Subsequently, with a release of rod member 25 so that pin members 28 recede radially inwardly into the groove portion 27 and away from the V-slot means 29 in ring member 4, then a further movement in the clockwise direction with respect to either sections 2 or 6 will cause a wedging of rollers 6 against cam surfaces 5 and the relocking of the hub section 1 with the annular race 7.

It is to be understood that other mechanical means may be provided for effecting the slight movement of the inner ring 4 with respect to hub 1 or with respect to the race member 7 so as to effect the unlocking of the inner clutch unit and be within the scope of the present invention providing for a dual overrunning over clutch assembly. Still further, it is of course not intended to limit the present invention to the use of any one type of one-way clutch unit or units. The present drawing is merely diagrammatic and various types of wedge or cam surfaces, or other sloping surfaces, may well be used in connection with the ring members 4 and 8. Cam surfaces 5 may be straight, but will generally be curved in order to provide improved efficiency in operation. Also, various means may be utilized to maintain the proper alignment and biasing of the roller members 6 and 10 within the respective clutch units. Actually, where desirable, suitable roller cage means may be used in each of the clutch units to provide alignment and slight spring biasing for the positioning of the roller means in the clutch assembly. FIG. 2 of the present drawing merely indicates diagrammatically the use of flexible bar-like alignment members 30 and 31 in combination with, respectively, each of the plurality of roller 6 and each of the plurality of rollers 10 for both the inner and outer clutch units.

Still further, various spring biased or cammed adjustment means may be used to connect with the axially positioned rod member 25 so as to in turn effect the periodic radial movement of pin members 28; and it is not intended to limit the dual clutch assembly to the use of any one special form of adjustment means. It may be pointed out that in the assembly of concentrically positioned and mounted one-way clutch units, as provided by the present invention, there shall be the proper orienting of the wedge surfaces or cammed surfaces for each of the respective cammed rings so that the rollers for each unit are wedged and locked for the same direction of rotation. Thus, where each of the sets of rollers are acting upon the internal movable ring or race member 7, the cam surfaces 5 and 9 for the respective cammed ring members will be in a reverse direction to effect the locking of rollers in one direction of assembly rotation and free movement in the other direction of rotation.

I claim as my invention:

1. A mechanically adjustable lock assembly that embodies dual overrunning roller clutch means and is adapted for positioning pivoted structures, with such assembly comprising in combination, a hub member adapted to be attached to a structure at a pivot point, an internal cammed ring mounted around said hub member and having a plurality of spaced cam surfaces and a plurality of rollers movably retained therearound, a movable ring-form race positioned around the rollers and providing an overrunning roller clutch action and engagement of said race with said hub for one direction of rotation, a second and outer cammed ring with a plurality of spaced cam surfaces and a plurality of rollers retained within the latter to thereby provide a second and outer overrunning roller clutch action and engagement of said outer ring with said race, said second cammed ring having its cam surfaces ramped oppositely to said inner cammed ring, whereby the race is clutched by said second plurality of rollers for the same direction of rotation as provided by the inner plurality of rollers, and means connecting said second and outer ring with a structure to be adjusted to effect the locking thereof in one direction of rotational movement and its mobility in the other direction.

2. The adjustable lock assembly of claim 1 further characterized in that at least one radially positioned pin means passes through said hub member and contacts said internal cammed ring, and means movable within the central portion of said hub member effects movement of said pin means radially inwardly and outwardly to effect the slight movement of said internal cammed ring and effect an unlocking of the plurality of rollers positioned between said internal cammed ring and said race whereby the latter becomes free to move in the normal lock direction.

3. The adjustable lock assembly of claim 2 still further characterized in that said radial pin means is moved by a radially moving axially positioned rod member having a sloping surface to engage the inner end of the pin means and effect an in and out radial movement of the latter to in turn effect the movement of the internal cammed ring which is in engagement with the outer end of said pin means.

4. The adjustable lock assembly of claim 1 further characterized in that brake band means encompasses at least one surface of said race and biasing means attached to said brake band in turn provides for a braking action on said race to preclude a too rapid a movement in at least one direction of rotational movement.

5. The adjustable lock assembly of claim 4 still further characterized in that said brake band means is positioned externally of said race and has spring biasing means to effect a continuous braking action on said race.

6. The mechanically adjustable lock assembly of claim 1 further characterized in that expandable brake band means is positioned internally within said race and biasing means connecting with the inside of said brake band means provides for the expansion of the latter to provide a braking action against the inside of said race for movement of the latter in at least one rotational direction.

References Cited

UNITED STATES PATENTS

| | | |
|---|---|---|
| 1,426,109 | 8/1922 | Rudolph et al. |
| 2,504,571 | 4/1950 | Noguera _____ 188—82.84 |
| 3,216,766 | 11/1965 | Tabor _____ 297—374 |

BENJAMIN W. WYCHE III, Primary Examiner

U.S. Cl. X.R.

188—82.5, 82.84; 192—12; 297—374